United States Patent
Das et al.

(10) Patent No.: US 11,507,664 B2
(45) Date of Patent: Nov. 22, 2022

(54) EARLY FILTERING OF CLEAN FILE USING DYNAMIC ANALYSIS

(71) Applicant: SonicWALL Inc., Milpitas, CA (US)

(72) Inventors: Soumyadipta Das, Bangalore (IN); SushilKumar Kuchan, Bangalore (IN); Aleksandr Dubrovsky, San Mateo, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 16/783,065

(22) Filed: Feb. 5, 2020

(65) Prior Publication Data

US 2021/0165882 A1  Jun. 3, 2021

Related U.S. Application Data

(60) Provisional application No. 62/943,134, filed on Dec. 3, 2019.

(51) Int. Cl.
| | |
|---|---|
| *G06F 11/00* | (2006.01) |
| *G06F 21/57* | (2013.01) |
| *G06F 21/56* | (2013.01) |
| *G06F 12/16* | (2006.01) |

(52) U.S. Cl.
CPC .......... *G06F 21/57* (2013.01); *G06F 21/563* (2013.01); *G06F 2221/033* (2013.01)

(58) Field of Classification Search
CPC ... G06F 21/57; G06F 21/563; G06F 2221/033
See application file for complete search history.

(56) References Cited

U.S. PATENT DOCUMENTS

| | | | | |
|---|---|---|---|---|
| 6,446,055 | B1* | 9/2002 | Grand | G06F 9/465 |
| | | | | 706/47 |
| 7,308,690 | B2* | 12/2007 | Brenner | G06F 9/4843 |
| | | | | 719/310 |
| 7,415,699 | B2* | 8/2008 | Gouriou | G06F 9/4843 |
| | | | | 717/124 |
| 9,465,656 | B2* | 10/2016 | Brenneman | G06F 9/4881 |
| 9,710,648 | B2* | 7/2017 | Weingarten | G06F 21/56 |
| 2005/0240769 | A1* | 10/2005 | Gassoway | G06F 21/51 |
| | | | | 713/176 |

(Continued)

*Primary Examiner* — Gary S Gracia
(74) *Attorney, Agent, or Firm* — Polsinelli LLP (57) ABSTRACT

The present disclosure is directed to analyzing received sets of computer data. Methods and apparatus consistent with the present disclosure may forecast that a received set of computer data does not include malware after allowing instructions included in that set of computer data to execute for an amount of time that does not exceed an allocated amount of time. Methods consistent with the present disclosure may instrument a set of received program code and allow instructions in that received set of program code to execute as instrumentation code collects information about the set of program code. This collected information may be compared with sets of known good data when determining whether a received set of program code is likely not to include malware. This collected information may be associated with "behaviors" performed by the received set of program code that may be identified using sets of contextual data.

20 Claims, 5 Drawing Sheets

(56) References Cited

U.S. PATENT DOCUMENTS

| | | | | |
|---|---|---|---|---|
| 2008/0022281 A1* | 1/2008 | Dubhashi | G06F 9/547 | |
| | | | 718/102 | |
| 2009/0328129 A1* | 12/2009 | Desai | G06F 21/6209 | |
| | | | 726/1 | |
| 2010/0100963 A1* | 4/2010 | Mahaffey | G06F 21/562 | |
| | | | 726/25 | |
| 2011/0265182 A1* | 10/2011 | Peinado | G06F 21/566 | |
| | | | 711/E12.001 | |
| 2012/0324575 A1* | 12/2012 | Choi | G06F 21/52 | |
| | | | 726/23 | |
| 2014/0137255 A1* | 5/2014 | Wang | G06F 21/566 | |
| | | | 726/24 | |
| 2016/0314298 A1* | 10/2016 | Martini | G06F 21/566 | |
| 2017/0270296 A1* | 9/2017 | Kraemer | G06F 21/52 | |
| 2017/0300691 A1* | 10/2017 | Upchurch | G06F 21/12 | |
| 2017/0329968 A1* | 11/2017 | Wachdorf | G06F 21/554 | |
| 2018/0013778 A1* | 1/2018 | Lim | H04L 63/101 | |
| 2018/0077187 A1* | 3/2018 | Garman | G06F 21/552 | |
| 2018/0082057 A1* | 3/2018 | LeMay | G06F 21/54 | |
| 2018/0322286 A1* | 11/2018 | Diehl | G06F 21/552 | |
| 2019/0205537 A1* | 7/2019 | Das | G06F 21/566 | |

* cited by examiner

EARLY FILTERING OF CLEAN FILE USING DYNAMIC ANALYSIS

CROSS REFERENCE TO RELATED APPLICATIONS

The Present Application claims the priority benefit of U.S. provisional application 62/943,134 filed Dec. 3, 2019, the disclosure of which is incorporated herein by reference.

BACKGROUND OF THE INVENTION

Field of Invention

The present disclosure generally relates to identifying that sets of computer data are free of malware. More specifically, the present disclosure relates to analyzing received computer data to determine whether instructions included in that computer data performs functions that are consistent with known good sets of program code.

Description of the Related Art

Analytical techniques for identifying whether a particular set of computer data is free of malware can be classified into at least two different types of analysis. A first type of analysis may be referred to as a static type of analysis and a second type of analysis may be referred to as a dynamic type of analysis. Static types of analysis include scanning of computer data received over a network for patterns that have previously been associated with a set of malware. Static malware analysis may include decrypting portions of a set of received computer data before scanning that computer data to see if it includes signatures that match signatures of known malware. This scanning of computer data received over a network for malware signatures is commonly referred to as deep packet inspection (DPI). The scanning of received computer data for malware is relatively efficient as DPI scans may only take a few milliseconds to perform. A disadvantage to static forms of analysis is that they can only detect malware that has previously been characterized. For example, DPI relies on generating signatures from received computer data and on comparing these signatures with signatures generated from program code that is known to include malware, when a set of computer data includes a set of malware that has not previously been characterized, DPI scanning would be unable to detect the malware. Another disadvantage associated with static malware detection analytical techniques is that they cannot identify whether a set of program code performs suspicious activity when that set of program code is executed by a processor. As such, these static techniques are limited as they cannot detect malware that has not previously been characterized.

In order to prevent new forms of malware from exploiting a computer, dynamic analysis techniques have been developed. These dynamic techniques may send a data set to an isolated physical or virtual computing machine that allows any executable code included in that data set to execute while a processor observes actions performed by the processor when the processor executes the code included in the data set. For example, dynamic analysis could identify that a set of program code is suspicious or malicious when that program code causes a processor to write to the boot block of a disk drive, to access or overwrite operating system or file system data, or to change the state of a variable unexpectedly. If this set of program code was not previously characterized, static types of analysis would not be able to detect that this set of program code performed suspicious or malicious actions when executed by a processor, where dynamic testing could. Such dynamic tests are often performed by a computer that is referred to as a "sandbox" or a "sandbox computer."

While dynamic analysis is powerful and can identify new types of malware, functions performed during this dynamic analysis consume precious time and computer resources. Furthermore, most of the sets of computer data received by computer systems are malware free. Commonly, at least 98% of computer data that are analyzed for the presence of malware are found to not contain malware. This means that large amounts of computing resources and time are spent every day on analyzing computer data that are malware free or "clean." As the amount of computer data shared over the Internet continues to grow, the amount of time and computing resources spent on detecting malware increases over time. As the distribution of computer data continues to grow, infrastructure capable of analyzing that computer data cannot be scaled up to perform dynamic analysis on all of that distributed computer data. Simply put, resources of a system that performs dynamic analysis on every instruction for every set of computer data sent over the internet would saturate system resources and would delay the delivery of data to users. For example, if a set of received program code is allowed to execute, it may take ten minutes for a processor to execute this set of program code from an initial instruction to a final instruction. This amount of time may be considered impractical. For example, there may not be enough computing power to allow instructions included in all data sets to execute from a first instruction to a final instruction without saturating the capabilities and resources of a dynamic analysis system. Furthermore, dynamically analyzing all received computer data could cause delays that are unacceptable to users as users may not be willing to wait to access data. Since millions of unique files are received daily for dynamic analysis, hosting infrastructure to analyze received files involves significant costs related to purchasing, operating, and maintaining the computers that perform dynamic analysis. Because of this, dynamic analysis is often performed on received computer data for a limited period of time. For example, if a time limit were set at five minutes, a dynamic analysis may be halted after a span of five minutes has transpired even when a last instruction in a received set of program code has not been executed. After dynamic analysis on a data set has been performed for the threshold time (e.g. five minutes), the dynamic analysis may be halted and the data set may be characterized as malware free or "clean." Dynamic analysis is an important requirement for protecting computer systems from being exploited by malware. This requirement conflicts with practical requirements relating to the cost and time it takes to maintain and run computer systems that perform dynamic analysis.

Even if the infrastructure were to be scaled up to meet a current daily average workload, spikes and surges in the number of data sets that need to be scanned could cause that infrastructure to become saturated. Furthermore the volume computer data that needs to be analyzed increases over time. As such, any current capability of performing dynamic analysis may always lag behind the demand for performing dynamic analysis. This means that the scaling up on infrastructure (e.g. increasing the number of computer that perform dynamic analysis) by itself cannot always meet the demand to perform dynamic analysis.

Since static types of analysis cannot identify all malware and since dynamic analytical systems are expensive or impractical to scale, what are needed are other methods and apparatus that evaluate data sets in a manner that is fast, efficient, affordable, and accurate.

SUMMARY OF THE CLAIMED INVENTION

The presently claimed invention relates to a method, a non-transitory computer readable storage medium, and an apparatus that may execute functions consistent with the present disclosure. A method consistent with the present disclosure may receive a first set of computer data that includes instructions executable by a processor and may include the processor executing the instructions that result in one or more actions being performed. The presently claimed method may also identify that the one or more actions performed correspond to known good actions associated with the execution of instructions included in one or more sets of known good program code, identify that data collected when the instructions in the first set of program code are executed correspond to normal program code operation, and may allow first received set of computer data to be sent to a destination when the operation of program code are consistent with known good program and with normal program code operation. The first set of computer data may be sent to the destination based on the identification that the one or more actions performed correspond to the known good actions and may be based on the identification that the collected data corresponds to the normal program code operation.

When the presently claimed invention is implemented as a non-transitory computer readable storage medium, a processor executing instructions out of the memory may implemented steps consistent with the presently claimed method. Here again the method may receive a first set of computer data that includes instructions executable by a processor and may include the processor executing the instructions that result in one or more actions being performed. This may also allow the processor to identify that the one or more actions performed correspond to known good actions associated with the execution of instructions included in one or more sets of known good program code, identify that data collected when the instructions in the first set of program code are executed correspond to normal program code operation, and may allow first received set of computer data to be sent to a destination when the operation of program code are consistent with known good program and with normal program code operation. The first set of computer data may be sent to the destination based on the identification that the one or more actions performed correspond to the known good actions and may be based on the identification that the collected data corresponds to the normal program code operation.

An apparatus consistent with the present disclosure may include a memory and a processor that executes instructions out of the memory to implement a method consistent with the present disclosure. In such an instance, the processor may execute instructions out of the memory to receive a first set of computer data that includes instructions executable by a processor and may include the processor executing the instructions that result in one or more actions being performed. The processor may also identify that the one or more actions performed correspond to known good actions associated with the execution of instructions included in one or more sets of known good program code, identify that data collected when the instructions in the first set of program code are executed correspond to normal program code operation, and may allow first received set of computer data to be sent to a destination when the operation of program code are consistent with known good program and with normal program code operation. The first set of computer data may be sent to the destination based on the identification that the one or more actions performed correspond to the known good actions and may be based on the identification that the collected data corresponds to the normal program code operation.

DETAILED DESCRIPTION

The present disclosure is directed to analyzing received sets of computer data. Methods and apparatus consistent with the present disclosure may forecast that a received set of computer data does not include malware after allowing instructions included in that set of computer data to execute for an amount of time that does not exceed an allocated amount of time. Methods consistent with the present disclosure may instrument a set of received program code and allow instructions in that received set of program code to execute as instrumentation code collects information about the set of program code. This collected information may be compared with sets of known good data when determining whether a received set of program code is likely not to include malware. This collected information may be associated with "behaviors" performed by the received set of program code. A received set of computer data may be provided to a destination when instructions included in that received set of computer data behave in a manner that is consistent with actions performed by a processor that executes instructions included in a set of known good program code.

The term "behaviors" used in the present disclosure may be classified into at least two groups, a first group of environmental behaviors that includes operations or actions performed by a set of program code and a second group of program code behaviors that include information relating to the memory and system state information. Environmental behaviors include actions that affect the operation of a peripheral device or an input/output port of a computer. Environmental behaviors include any function that interacts with a camera, a microphone, a speaker, a display, or a disk drive. Exemplary environmental behaviors include the actions of sending information to a display, turning a peripheral device on or off, and sending or receiving data via a communication interface. In certain instances, memory accesses or the reading or writing of data to a non-volatile data storage device may be considered an environmental behavior. Program code behaviors relate to actions that affect the operation of a one or more sets of program code of a computer system. The changing of data included in a computer registry, a register of a central processing unit (CPU), a system file, a boot file, or a boot block of a disk drive may be considered program code behaviors because such changes are operations that affect the behavior of a set of program code.

Methods and apparatus consistent with the present disclosure may include collecting sets of known good behavioral information that may include both environmental behavioral data and program code behavioral data. These different sets of behavioral data may be combined and stored as a set of known good system state information characteristic of one or more known good behaviors. Known good behaviors, may include one or more actions performed by a processor when that processor executes instructions in a set of known good program code.

The known good system state information may include information that identifies actions performed by the operation of a set of program code and may include information regarding memory access patterns, a state of memory, a state of a process, the content of certain CPU registers, parameters associated with a process performed by a processor executing code of the application, the content of certain memory locations, information relating to an operating system state, a change in an operating system file data, or the accessing of file system data when a set of known good program code is executed by a processor. Sets of known good system state information may be identified or learned when a processor executes instructions associated with a set of binary instrumentation code that collects known good information when instructions in a set of known good program code are executed. This known good system state information may be referred to as contextual information that is collected by a set of instrumentation code when instructions in a set of program code are executed. This instrumentation code is program code that executes when another set of program code, that is being examined is executed. As such, instrumentation code may execute substantially concurrently with a set of program code that is being examined by the processor executing the instrumentation code. This process may include an interleaving of execution of the different types of instructions. For example, one or more instructions of program code associated with the code being examined may be executed followed by one or more instructions of the instrumentation code. As such, different sets of program code may be interleaved. Such instrumentation code makes it possible to gain insight into the behavior of a set of program code to determine that a set of program code is likely to be malware free/clean based on instructions included in that set of program code performing in ways that are consistent with how known good computer programs perform.

The learning process mentioned above may include sequentially running known good sets of program code when collecting behavioral information about the known good sets of program code. This collected behavioral information may be classified as "known good system state and action data" because the collected information may include a combination of system state data and data that identifies actions or processes associated with a set of known good program code. In certain instances this known good system state and action data may be collected when different sets of known good program code are independently executed.

Methods and apparatus consistent with the present disclosure may collect information from a set of known good program code at runtime using techniques that are similar to those that are referred to as an analysis of CPU state information, runtime executable information, and/or other system memory information. Processes consistent with the present disclosure may execute potentially known good program code or untested program as a child process in a detection framework. Since child processes are processes created by a parent process, such a runtime exploit detection framework may inject probes as child processes that collect data associated with actions are performed when a processor executes instructions from a set of known good program code. These probes may be used to identify known good actions based on the fact that they are associated with a set of program code designated as 'known good' by an administrator, for example. As such, probes that collect information when monitoring operations of program code and may include child processes generated within a runtime exploit detection framework. Child processes are software sub-processes that are typically created by a software "parent" process that may be a main process that can create several child processes. While a parent process may have many child processes, a particular child process will typically be associated with only a single parent process.

The instrumentation code can remain entirely transparent to an application or set of program code that it's been injected into, the instrumentation code may be used to pass contextual information relating to the behavior of that software application as it executes in real-time or near-real-time. As such, processes pertaining to an application program may be monitored by a processor executing code that analyzes what the application program does by reviewing the contextual information passed from the instrumentation code. As discussed above "system state" or "contextual information" may include information regarding memory access patterns, a state of memory, a state of a process, the content of certain CPU registers, parameters associated with a process performed by a processor executing code of the application, the content of certain memory locations, information relating to an operating system state, a change in an operating system file data, or the accessing of file system data when a set of known good program code is executed by a processor Contextual information may also be collected when instructions in an uncharacterized set of program code are executed. In such an instance, contextual information collected by instrumentation code may be compared with known good sets of contextual information when identifying whether the uncharacterized set of program code behaves like a set of known good program code. Since this contextual information includes the content of certain computer registers, parameters associated with a process performed by a processor executing code of the application, the content of certain memory locations, information that relates to the state of a memory, or information relating to the allocation of memory or other actions. Analysis of an application at runtime using binary instrumentation makes it possible to gain insight into the behavior of a particular application including internal central processing unit (CPU) registers and memory state of the application throughout its execution. Contextual information may also include information that identifies actions performed when a set of program code is executed or may include information that identifies memory addresses accessed when program code is executed, or may include information that cross-references memory addresses allocated to a certain type of process with memory addresses accessed by a processor when performing a function consistent with that particular type of process. Such evaluations may be performed at a time when a program application runs (at runtime) using binary instrumentation makes it possible to gain insight into the behavior of a particular application including internal central processing unit (CPU) registers and memory state of the application throughout its execution. As such, the detection of known good behaviors by the analysis of CPU state information, runtime executable information, and/or other system memory information is one of the key differences between detecting potential exploits via techniques consistent with the present disclosure as compared to conventional static binary analysis or other forms of dynamic analysis.

Note that program code may be associated with a different set of contextual information than a set of contextual information that is associated with analysis code that may be used to analyze the program code. As such, a set of program code may be associated with a first set of contextual information and analysis code may be associated with a second set of contextual information. These different sets of contextual information may be related to different distinct process of the program code and of a set analysis code. This may be true even when the analysis code analyzes the real-time execution of the program code. Analysis code consistent with the present disclosure may execute as a background task that is an independent process from a process associated with the execution of program code. In certain instances, this analysis code may poll memory associated with program code using techniques associated with the previously mentioned analysis of CPU state information, runtime executable information, and/or other system memory information.

Similarly, the analysis of CPU state information, runtime executable information, and/or other system memory information may be used to send probes to detect actions performed by a processor executing instructions included in a set of received computer data. Such anmay be used to examine the content of certain computer registers, identify parameters associated with a process performed by a processor executing code of the application, evaluate the content of certain memory locations, collect information that relates to the state of a memory, collect information relating to the allocation of memory, or identify information related to other actions performed by a processor executing instructions from the set of received computer data. Any or all of the information collected by instrumentation code executed concurrently with instructions from the set of received computer data may be compared with known good information collected by instrumentation previously executed concurrently with sets of known good program code. As such, analysis software may identify the absence of malicious or suspicious code via instrumentation code that matches program code contexts to criteria that are associated with the behavior of known good sets of program code. Alternatively or additionally, analysis software may identify malicious or suspicious code by matching the presence of malicious or suspicious code contexts with contextual information that is associated with malicious or suspicious activity.

Methods consistent with the present disclosure may identify that received sets of computer data are good using information collected by a processor at a sandbox computer when instructions in those received sets of computer data are executed. Methods and apparatus consistent with the present disclosure may also require that the received sets of program code access memory locations that are a known good memory locations. Memory locations accessed by a processor that executes a set known good program code may be identified as being good memory locations based on the fact that memory location information was collected when a known good set of program code was executed. In certain instances, known good memory locations may be identified based on memory addresses allocated to perform a certain processes. As such accessing certain absolute or relative memory addresses may be associated with one or more known good actions. A relative memory address may be associated with a particular span of system RAM that was allocated when a particular process was initiated. For example, if RAM memory locations 0 X AB00 through 0 X ABC0 are allocated to a process that generates a window to display on a display, and a process that generates the window is observed as only accessing the allocated RAM memory locations of 0 X AB00 through 0 X ABC0 could be considered actions that constitute good program behavior.

Memory access patterns consistent with good memory accesses may include identifying a region of memory that has been allocated for a particular process. For example, memory addresses associated with a region of random access memory (RAM) allocated for a word processing application program (e.g. Microsoft Word) may be identified and any functions associated with running the Microsoft Word program that cause a RAM memory address to be accessed that does not correspond to the allocated region of RAM for Microsoft (MS) Word may be identified as being suspicious. Similarly, logical blocks of a disk drive used to store program code associated with an application program may be identified and if a process associated with that particular application program access a logical block that is different from the logical blocks used to access an MS Word application or data may be identified as being suspicious. Conversely, any memory address or logical block accessed by a instructions in a set of program code that corresponds to known good application program activity may be considered a clean set of program code.

State information that may be associated with a clean set of program code may include identifying that portions of computer data in a set of computer data that are flagged as being not executable does not change to indicating that the computer data is executable. Conversely, a memory state that changes from indicating that asset of computer data is not executable to indicating that the computer data is executable may be considered suspicious. Other state information that may indicate that a set of computer data is performing as expected may be associated with a number of instructions executed per second or over a time span by a processor. When a processor executes a number of instructions over time is at or above a threshold level, a set of program code that includes those instructions may be considered clean. When the processor executes a number of instructions over time is below the threshold level, the set of program code that includes those instructions may be considered suspicious.

Actions performed by the known good sets of program code may be characterized by monitoring each of the known good sets of program code one at a time. This process may include selecting a plurality of sets of known good program code, instrumenting the sets of known good program code, allowing each respective set of known good program code to execute, identifying actions performed by the set of known good program code, and storing information that can be used to identify the known good program code actions. Actions that may be associated with known good program code may include, yet are not limited to behaviors identified by one or more of a processor identifying that a set of program code that: a) performs actions that require a user response; b) does not perform actions that delays the execution of instructions, or that c) performs delaying operations that are limited to "allowable delaying operations." An example of an allowable delaying operation includes waiting for a user response after a prompt for user input has been sent to a user interface.

Figure 1:
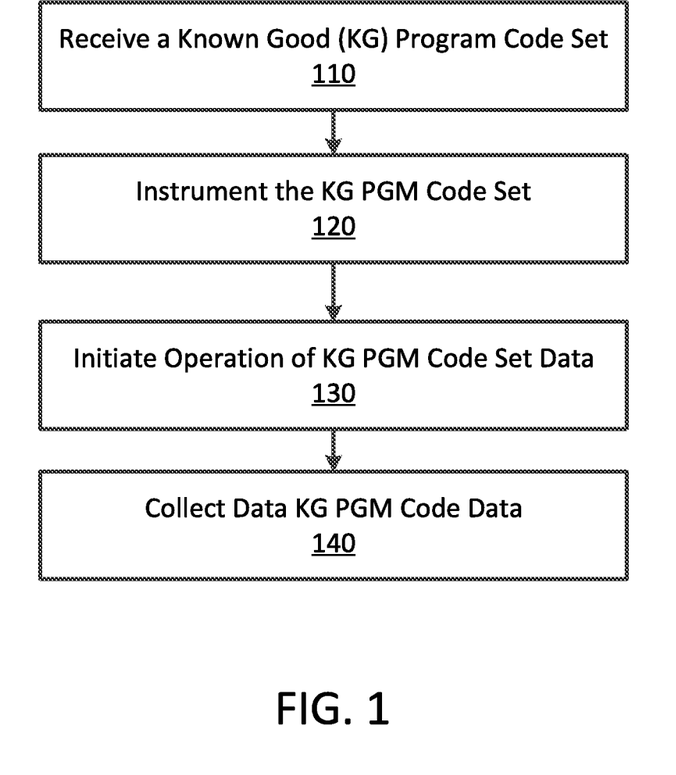
FIG. 1 illustrates a process that collects known good behavioral data and known good system state information when different known good sets of program code are executed.

FIG. 1 illustrates a process that collects known good behavioral data and known good system state information when different known good sets of program code are executed. FIG. 1 begins with step 110 where a set of known good program code is received. This set of known good program code may have been selected by an administrator and could include a Microsoft Word file or other type of executable code. Known good sets of program code may also be attached to a message, for example an email message that includes an executable file. Step 120 of FIG. 1 is a step where the known good program code is instrumented. The instrumentation of the known good program code may include interleaving instructions associated with the known good program code with instrumentation code instructions. Step 130 of FIG. 1 may be a step where the known good program code is executed as the instrumentation code collects data associated with the execution of the known good program code in step 140 of FIG. 1. The steps of FIG. 1 may be performed for each of a series of known good program code sets that have been identified or staged for operation. By collecting system state and behavioral data (e.g. the aforementioned contextual information) when each of a plurality of different sets of known good program code are executed allows the collected data to be evaluated and organized in data sets that include known good environmental data or behaviors and known good program code data or behaviors. When a new set of program code is analyzed to see if it is malware free, instrumentation code may be used to collect information regarding the operation of the new set of program code. The data collected when the new set of program code may then be compared to the sets of known good program code data and behavioral data to identify whether the new data set is likely malware free as illustrated in respect to FIG. 2. As such, different types of contextual information may be compared and contrasted when classifying a set of received computer data.

Figure 2:
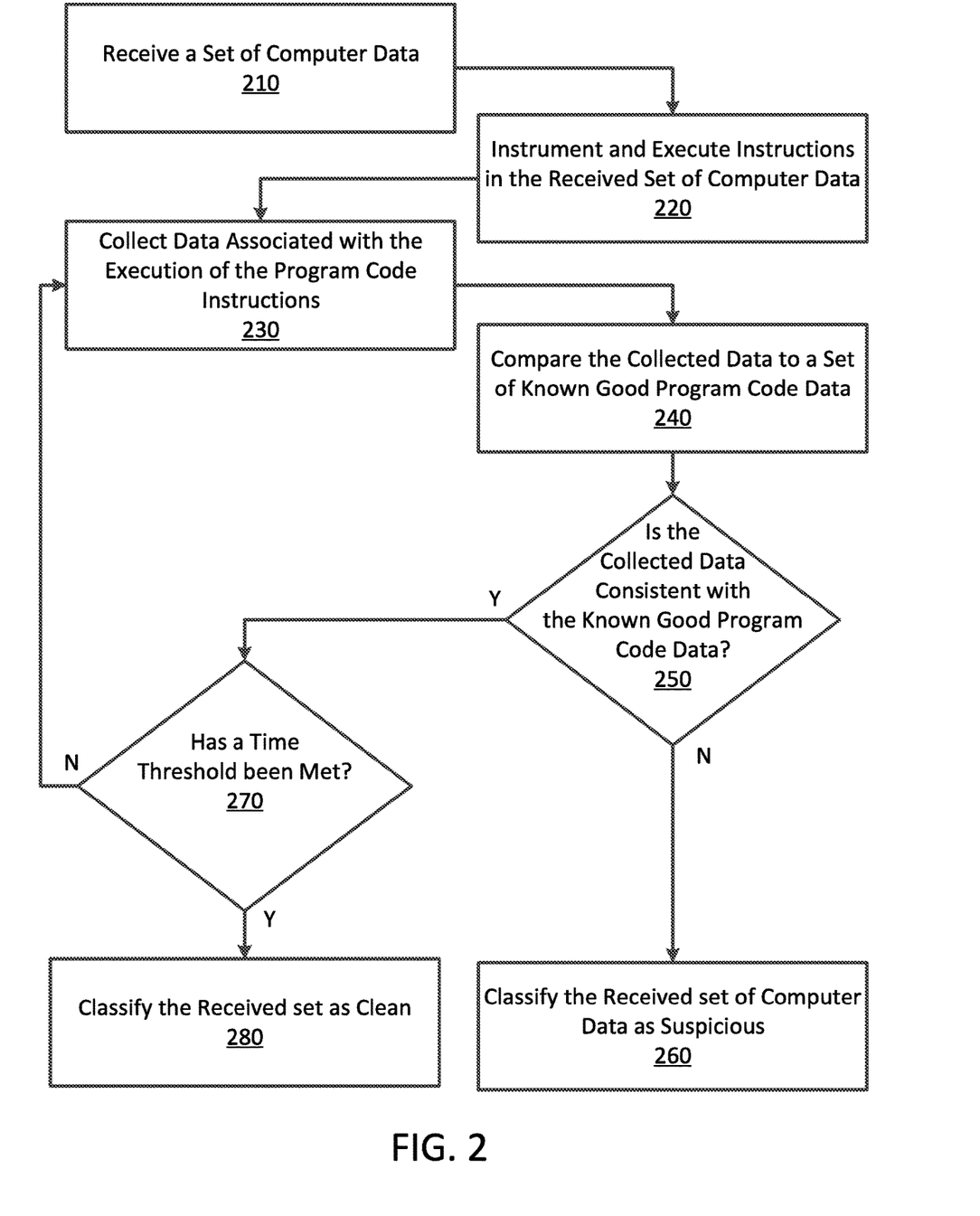
FIG. 2 illustrates a set of steps that may be performed by a computer when performing an analysis on recently received computer data when the recently received computer data is evaluated to see if it likely does not perform any suspicious activity.

FIG. 2 illustrates a set of steps that may be performed by a computer when performing an analysis on recently received computer data when the recently received computer data is evaluated to see if it likely does not perform any suspicious activity. Instructions included in a received set of program code may be allowed to be executed by a processor at a computer system that may be referred to as a "sandbox" or "sandbox computer." As previously discusses such "sandbox" computers may be designated to execute potentially malicious code in an isolated environment that allows program code to operate when an analysis is performed on computer data. Step 210 of FIG. 2 is a step where a set of computer data is received, next that received set of computer data may be instrumented and run as a child process, for example, in step 220 of FIG. 2. As the instructions of the received program code are executed, data associated with the execution of those instructions may be collected by instrumentation code in step 230. Next in step 240 of FIG. 2, the instruction execution data collected in step 230 may be compared with the known good program code data that was collected and stored in the steps of FIG. 1. The data collected in step 230 and the known good program code compared to this collected data is step 240 of FIG. 2 may include data consistent with the previously discussed contextual information. As such, this contextual information may be associated with both of the previously discussed environmental behaviors or program code behaviors.

This process may include a processor that executes a set of instrumentation code used to collect and analyze actions and data associated with a set of program code received at sandbox computer. The execution of these two different sets of program code (instrumentation code and received program code) may allow a processor to characterize operations performed by the set of received program code. The processor may identify that the received set of program code should be classified as "clean," "suspicious," or "malicious." This analysis may be performed in real-time or near-real-time as a processor executes instructions included in a received set of computer data. This analysis may include the processor comparing actions performed by the processor with known good actions performed by one or more sets of known good program code. This analysis may also allow the processor to review other information that may be associated with known good program code. This other information may include comparing memory locations accessed or memory state information with known good memory access patterns or with known good memory state information when the processor classifies the program code. As such, determination step 250 may identify whether the collected instrumentation execution data is consistent with the known good program code data. When determination step 250 identifies that the collected instrumentation execution data is not consistent with the known good program code data, program flow may move to step 260 where the received set of computer data may be classified as suspicious. When determination step 250 identifies that the instrumentation execution data is consistent with the known good program code data, program flow may move from determination step 250 to determination step 270 that identifies weather a time threshold been met, when no program flow may move back to step 230 where additional instrumentation data may be received. When determination step 270 identifies that the time threshold has been met program flow may move to step 280 where the received data set is classified as clean or likely to be malware free. The received data set may then be allowed to be provided to a destination based on the clean classification.

Actions that are not consistent with actions performed by known good or clean sets of program code may include delaying the execution of instructions included in the received set of computer data. Such delays may be classified as either a passive delay or an active delay. Passive delays are actions that cause a set of program code to relinquish usage of processing cycles of a processor for an amount of time or until a certain type of event occurs. Examples of passive delays include executing a sleep instruction or an instruction that causes a processor not to allocate time slices for the execution of program code until after an operating system event occurs, until after an operating system command has been initiated, or until after a OS semaphore is encountered. For example, a wait command that causes activity to be paused until a shutdown event is initiated may be considered wait that is suspicious. An active delay is characterized by a program code that causes a processor to execute instructions that are worthless or that don't perform a useful output. For example program code that causes a processor to execute a series of no-operation instructions (NOPS), to initiate and decrement a timer, to interpret mouse motions, or to process keyboard instructions may be classified as suspicious. This may especially be true when mouse or keyboard inputs are received when no mouse or keyboard are connected to the computer that is executing the set of program code. As such other actions that are inconsistent with known good program code behavior is the receipt of computer mouse or keyboard inputs when a computer mouse or keyboard is not attached to the computer or waiting until a certain type of operating system command is executed. The mouse movement or the keyboard entries observed when a set of program code may be suspicious as movement of a mouse may help slow down the execution of instructions included in a set of program code. The very presence of such passive or active delays may be sufficient to classify a set of program code as suspicious.

As such, actions that are not consistent with actions performed by known good sets of program code may include delaying the execution of instructions included in the received set of computer data. Actions that are inconsistent with the execution of known good program code include executing no-operation instructions (NOPS), the setting of a timer, and identification that data self-extracted from a set of received computer data, or may include execution of a sleep instruction that causes instructions to be paused until a certain event or operating system command is scheduled for operation. Each of these different actions may delay the execution of instructions and these delaying actions may be an attempt to hide the presence of malware in a set of computer data. For example, a hacker may understand that sandbox computers are often configured to execute potentially malicious code in an isolated environment for a limited amount of time and the hacker could add instructions to a malicious set of program code that delay the execution of malicious program code instructions. As such the presence of passive or active delays included a set of program code may cause a set of program code to be classified as suspicious.

Methods and apparatus consistent with the present disclosure may flag a set of computer data as suspicious when a set of program code appears to intentionally delay the execution of instructions included in a set of program code. For example, a hacker may cause the execution of suspicious activity in a set of computer data to be delayed for a time that is greater than a time period allocated for a sandbox computer to perform an analysis. In instances where a sandbox computer performs an analysis for a span of time of four minutes, a set of malware that delays suspicious activity for greater than four minutes would not be detected by this sandbox computer. Since most sandbox computers are not allowed to monitor actions performed by received sets of program code for extended periods of time, most sandbox computers may be unable to detect malware present in a set of program code when that set of program code delays execution of malicious code for an amount of time that is greater than a timeout or threshold time.

Behaviors, actions, or sets of actions may also be associated with either good behaviors or with suspicious behaviors. Memory access patterns consistent with good memory accesses may include identifying a region of memory that has been allocated for a particular process. For example, memory addresses associated with a region of random access memory (RAM) allocated for a word processing application program (e.g. Microsoft Word) may be identified and any functions associated with running the Microsoft Word program that cause a RAM memory address to be accessed that does not correspond to the allocated region of RAM for Microsoft Word may be identified as being suspicious. Similarly, logical blocks of a disk drive used to store program code associated with an application program may be identified and if a process associated with that particular application program accesses a logical block that is different from logical blocks accessed associated with the correct accessing of data associated with that particular application program may be a reason to classify that program code as being suspicious. Conversely, any memory access that corresponds to known good application program activity may cause a set of program code to be classified as clean (malware free).

In certain instances, the processor may identify that the received set of program code does not include malware when the actions performed during the execution of the received set of computer data correspond to, are consistent with, or match actions performed by the known good sets of program code. This process may also require that memory locations accessed by the processor during the allocated time period correspond to or match memory locations accessed by known good sets of program code. This type of analysis may include executing program code included in a set of received computer data and may include monitoring the execution of that program code. Since methods and apparatus consistent with the present disclosure evaluate sets of computer data for known good actions and the lack of suspicious actions, methods consistent with the present disclosure may allow apparatus to perform analysis more reliably even when these evaluations are performed for limited period of time. As such, when determination step 250 identifies that the collected instrumentation execution data is consistent with the known good program code data, program flow may move to determination step 270. Determination step 270 may identify whether an execution time corresponds (equals or exceeds) to an execution time threshold, when no program flow may move back to step 230 where additional data regarding the execution of the instructions in the received set of computer data are collected. When determination step 270 identifies that the execution time does correspond to the execution time threshold, program flow may move to step 280 where the set of computer data is allowed to be sent to a destination. The time threshold discussed in respect to FIG. 2 may correspond to a time period when the instructions included in the received computer data are executed. Such evaluations may end after the time period or may end earlier after the received set of computer data is classified as being suspicious. This time threshold may be set by an administrator.

While not illustrated in FIG. 2, program code that is identified as being suspicious may be tested further to see if that program code actually does perform a malicious act. This additional testing may be performed at a time when network activity is low, for example in the middle of the night or at another time when amounts of data being communicated via a computer network drops below a threshold amount. Such a communication threshold may correspond to a number of sets of computer data received per unit time (e.g. per millisecond, second, or minute). This additional testing may allow a set of code to be run completely and when that set of program code is confirmed to include malware, one or more signatures may be collected. These signatures may then be associated with malware and be provided to deep packet inspection (DPI) processes at a firewall. In such instances, a set of received computer data may be initially scanned at a firewall and that set of computer data may be passed to a sandbox computer for additional analysis when a DPI scan does not detect a malware signature from data included in the set of computer data. In an instance when the sandbox computer identifies that the DPI scanned computer data is suspicious the sandbox computer may instruct the firewall to block the set of computer data from being sent to a destination. In such instances, the firewall may withhold at least one data packet from a set of data packets that include computer data until a result is received from the sandbox computer. In instances when the firewall is instructed that a set of computer data is clean, the firewall may send that set of computer data or any outstanding portion of that computer data to the destination.

In instances when instructions associated with a set of received computer data perform actions that are not consistent (e.g. do not match) actions performed by known good sets of program code, the received data set may be classified as suspicious. Similarly when the instructions of the received set of computer data cause the processor to access a memory location that is not associated with known good memory locations, the received data set may be classified as suspicious.

Actions that may be associated with a known good or clean sets of program code may include preparing information to be provided to a user that will require a user response or identifying that information has been sent to a user interface for a user to respond to. As such actions associated with generating a graphical user interface (GUI) to be provided to a user, the providing of a GUI to a display driver, the display of the GUI, or the preparation or displaying of a command line that expects user input may be associated with operations consistent with a good or clean set of program code instructions.

Application program code behaviors include code that extracts other code from a set of program code. A program code set that performs the action of self-extracting instructions out of the set of program code may be considered suspicious. This may be especially true when the instructions extracted out of the set of program code are a different type of program code than the set of program code. For example, when a set of program code is a Microsoft Excel .XLS type of file data and when program code in that .XLS file is executed causes program code of a different type to be accessed using extracted instructions, the .XLS file may be classified as suspicious. The self-extraction of instructions from a set of program code is a program code behavior that may indicate that a set of computer data may include malware hidden within the set of program code. While the code fragments directed to the extraction of instructions from a set of program code is not itself a malicious act, the action of extracting code may be used to classify a set of program code as being suspicious. The self-extraction of program code from a set of received computer data may be identified by the program code performing operations that reorganizes data or that generates a new set of instructions from data included in the set of received computer data without the user being informed or asked whether such an operation can be performed. Conversely, the absence of self-extracting program code may be considered to be consistent with a good behavior performed by a set of program code.

The contextual information discussed above may be used to track a series of changes in system state information. Variables associated with locations where certain data is stored in memory may be tracked as the content of memory change over time. Changes in system state may be tracked over time as instructions included in portions of a set of program code (e.g. instructions included in a code fragment) are executed. These changes may include identifying data that is carried over from a previous processing cycle to a current processing cycle when a set of instructions operates according to a stateful protocol. Alternatively or additionally, system state information may be stored by instrumentation code that observe program code that operates according to a stateless protocol where data from a previous processing cycle is not carried over to a current processing cycle. In such instances, a set of instrumentation code may be executed according to a stateful protocol when a set of coincidentally executed program code executes either according to a stateful or a stateless protocol. This collected information may be used to map a sequence of events that begin when a first group of instructions of a set of program code are executed and that are collected until the set of program code is classified as suspicious or until a timer reaches a threshold value.

The mapping of this contextual data may include identifying patterns of activity. Contextual information of a set of known good program code may be used to generate a mapping of a flow of operations that proceed from an initial point and that proceed toward a result that accomplishes a task that us user would judge as being useful. For example, the opening of a Microsoft Visio drawing file may cause a processor to execute instructions relating to the opening of the Microsoft Visio program. These instructions may cause the processor to access file system data to identify logical blocks on a disk drive that must be accessed to open Microsoft Visio. Additional contextual information may be collected that accesses drawing .VSD data of the drawing that is being prepared for presentation on a display. In instances when a password is required to access certain types of data, the program may execute instructions to generate a GUI that includes user selection or data entry boxes. This may result in data of the VISIO program and data from a particular drawing being sent to a display adapter or chip that may be coupled to a display. As such, program code that includes a flow of instructions that when executed by a processor are consistent with a set of states of known good program code may be used to identify that a set of program code is likely malware free.

Figure 3:
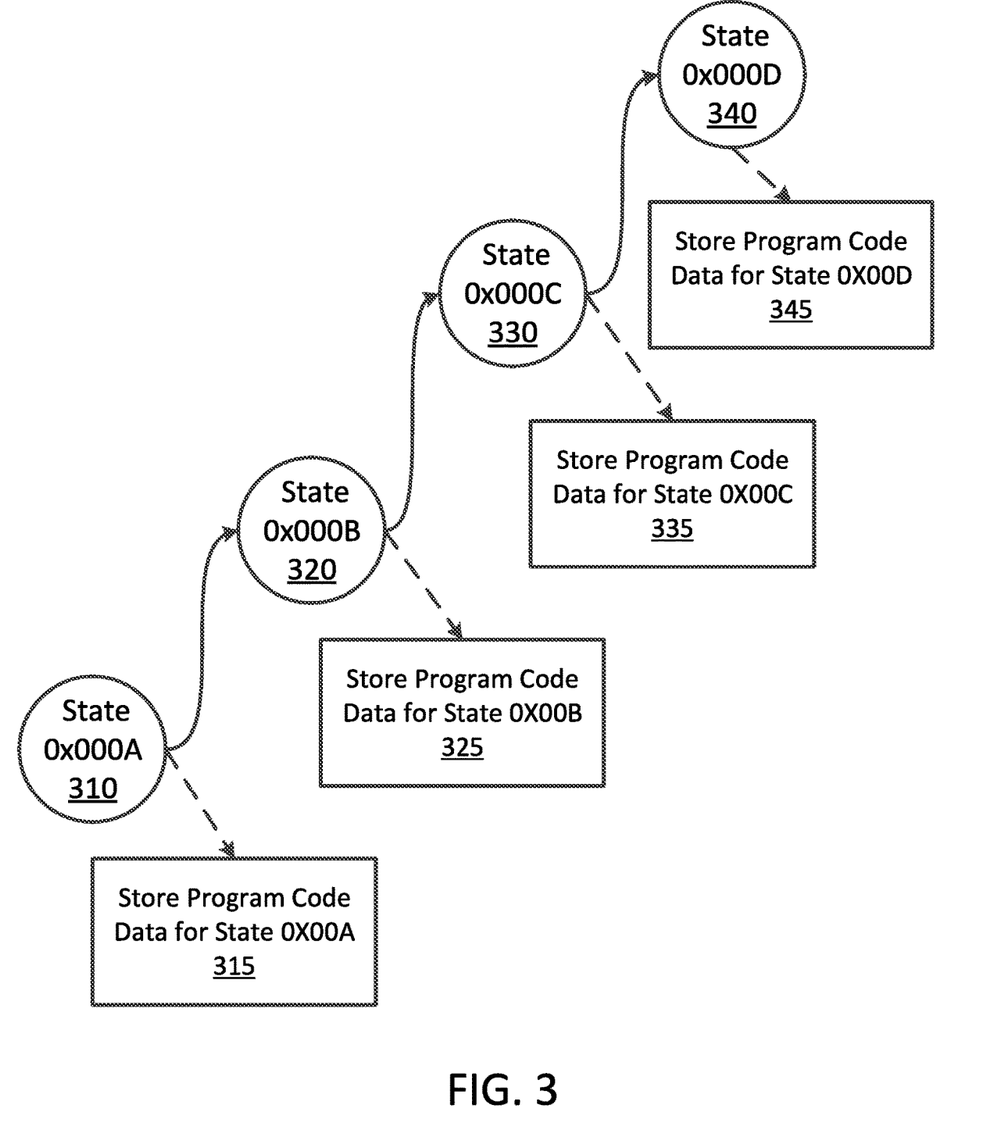
FIG. 3 illustrates exemplary actions that may be performed by a set of program code when that program code is executed by a processor.

FIG. 3 illustrates exemplary actions that may be performed by a set of program code when that program code is executed by a processor. FIG. 3 includes items (state identifiers) 310, 320, 330, and 340 that respectively represent states 0x000A, 0x00B, 0x00C, and 0x000D (0x000A through 0x000D). Each of the states 0x000A through 0x000D may correspond to an action performed by the processor executing program code. Steps 315, 325, 335, and 345 and data associated with each of the states 0x000A through 0x000D may be stored in memory when actions associated with each state 0x000A through 0x000D are performed. As such step 315 may be associated with program code data from state 0x000A, step 325 may be associated with program code data from state 0x000B, step 335 may be associated with program code data from state 0x000C, and step 345 may be associated with program code data from state 0x000D.

Each of the different state identifiers 0x000A, 0x000B, 0x000C, and 0x000D may correspond to a unique type of action. Table 1 illustrates exemplary state identifiers, actions, and interpretations of program code data. Note that table 1 identifies that:

State 0x000A corresponds to an action of initiating Microsoft word and to interpreted program code data that identifies that a memory access accessed data associated with the Microsoft Word application program;

State 0x000B corresponds to an action of accessing Microsoft Word data and to interpreted program code data that identifies memory locations where a Microsoft Word file is located.

State 0x000C corresponds to an action of generating display information and to interpreted program code data that identifies that the generated display information includes a user data entry box; and State 0x000D corresponds to an action of the storing the generated display information at a memory address allocated for storing Microsoft Word display data.

The actions identified in table 1 may correspond to sets of data collected from known good sets of program code. The interpretations of program code data column of table 1 be coupled to one or more constraints or rules that may be used to test newly received sets of computer data. A rule may identify that a processor executing instructions associated with any of the actions (or processes) included in table 1 must access memory locations associated a specific action or memory locations that are consistent with the proper execution of an action. A rule relating to the action (or process) of initiating MS Word may require that memory accesses be tied to a set of constraints or limitations of a) accessing file system memory locations that are known point to MS word program code, b) accessing logical blocks correctly identified as being MS Word program code locations, and c) accessing memory locations allocated to store MS Word program code in system RAM. Accesses to other memory locations during this process may be considered suspicious. This is especially true in instances when program code that is supposed to initiate an instance of MS Word accesses memory locations known to be associated with processes that are not related to MS Word. For example, assume that an email was received that includes an MS Word Attachment and that when the attachment is opened, processes consistent with any of the actions included in table 1 that result in accessing unrelated file system memory locations, other file data (e.g. MS word data of other documents stored at a computer or Excel file data), or that initiates the transfer of data to an external computer may be identified as being inconsistent with known good program code actions and such an identification may cause this MS Word attachment as being classified as being suspicious. This identification may cause the received email message to be quarantined or deleted.

TABLE 1

State, Action, Program Code Cross Reference

| State | Action | Interpreted Program Code Data |
|---|---|---|
| 0x000A | Initiate MS Word | Memory Access Data => MS Word |
| 0x000B | Access MS Word Data | Memory Access Data => Word File Location |
| 0x000C | Generate Display Information | Display Information => User Data Entry Box |
| 0x000D | Store the Generated Display Information | Display Information Stored in Location => Allocated for Storing MS Word Display Data |

Other type of tests that may be used to identify whether a set of program code includes instructions that delay the operation of program code in a set of computer data may create mappings like the mapping illustrated in FIG. 3. Data collected by inspection code may create this mapping and may populate a table of data that includes information similar to the data stored in table 1.

As previously mentioned, program code that delays operation of instructions may be attempting to prevent a sandbox computer from being able to identify that the program code include malicious code. Table 2 includes a series of actions that may be indicative that a set of program code is delaying program code operation. Table 2 includes state 0x0001 that corresponds to actions of interpreting mouse or keyboard entries with a mouse or keyboard are not attached to the computer executing instructions in the set of program code. Table 2 also includes states 0x0010, 0x001A, 0x001B, 0x001C that respectively identify actions that delay program code operation of repetitively copying data to various locations without performing computations, setting up and decrementing a counter, executing a series of no operation (NOP) instructions, and receiving a wait command. Each of these actions or sets of actions may be interpreted as program code functions that unnecessarily delay the execution of program. As such, each of these delay actions may be interpreted to be unnecessary delay actions. Similarly, the series of a set of different delay actions that are performed sequentially may also be interpreted to be unnecessary delay actions.

TABLE 2

State, Action, Unnecessary Delay Action Code Cross Reference

| State | Action | Interpreted Program Code Data |
|---|---|---|
| 0x0001 | Mouse or Keyboard Entries when no Mouse or Keyboard is Used | Unnecessary Delay Action |
| 0x0010 | Repetitively Copying Data From One Memory Address to Another Memory Address Without Performing Computations | Unnecessary Delay Action |
| 0x001A | Setting and Decrementing a Counter | Unnecessary Delay Action |
| 0x001B | A Series of NOP Operations Being Executed | Unnecessary Delay Action |

Figure 4:
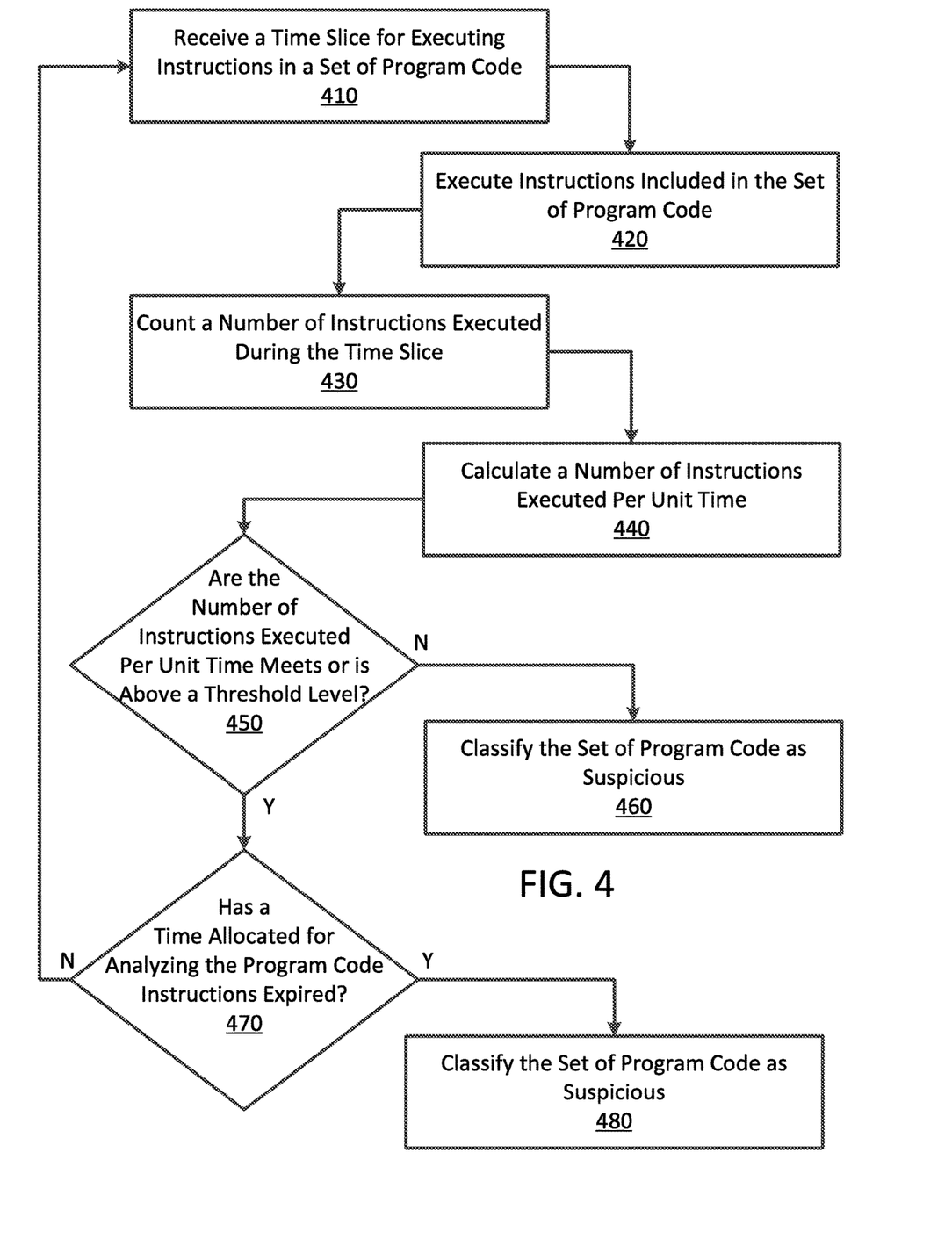
FIG. 4 illustrates method for identifying whether a set of program code may be delaying the operation of instructions in the set of program code.

FIG. 4 illustrates method for identifying whether a set of program code may be delaying the operation of instructions in the set of program code. FIG. 4 begins with step 410 where a time slot for executing instructions included in a set of program code is allocated to the set of program. Next in step 420, a processor may execute instructions included in the set of program code. As these instructions are executed during the time slice, a number of instructions executed during that time slice may be counted in step 430 of FIG. 4. Next in step 440 a calculation is performed that identifies a number of instructions per unit time were executed.

The calculation performed in step 440 may identify that a processor executed 10 instructions per microsecond. Determination step 450 may identify whether the number of instructions executed per unit time meets or is above a threshold level. In an instance when the threshold level is 10 instructions per microsecond, determination step 450 will identify that the number of instructions per unit time does not meet the threshold level because 10 instructions per microsecond is less than 11 instructions per microsecond. In such an instance, program flow will move to step 460 where the set of program code may be classified as suspicious. When determination step 450 identifies that the number of instructions per unit time is equal to or exceeds (meets or is above) the threshold level, program flow may move to determination step 470 that identifies whether an amount of time allocated for analyzing the set of program code has expired (or transpired), when no program flow may move back to step 410 of FIG. 4. When the amount of time allocated for analyzing the set of program code has expired, FIG. 4 illustrates program flow moving from step 470 to step 480. As such, methods consistent with the present disclosure may identify that a set of program code is executed by a processor in a manner that is unusually slow and such an identification could result in that set of program code being classified as being suspicious.

Figure 5:
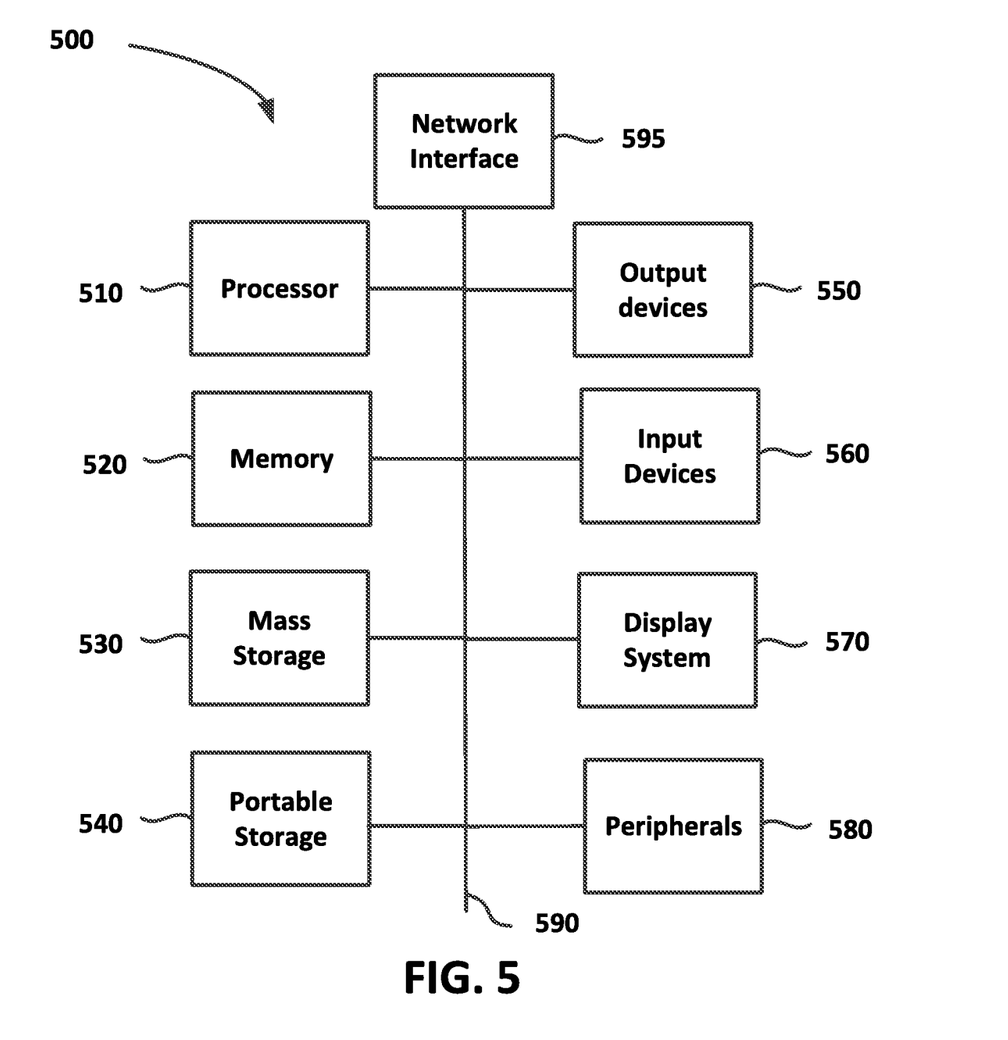
FIG. 5 illustrates a computing system that may be used to implement an embodiment of the present invention.

FIG. 5 illustrates a computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for analyzing received computer data, the method comprising:
   receiving a first set of computer data that includes instructions executable by a processor before the first set of computer data is received by an intended destination;
   creating a child process by the processor based on execution of instructions of a parent process such that a set of actions performed by the execution of the child process are observed by the processor;
   executing the instructions included in the first set of computer data based on the creation of the child process and the observations by the processor, wherein the execution of the instructions of the first set of computer data results in the set of actions being performed by the processor;

executing the instructions of the parent process to compare the set of actions of the first set of computer data with known good actions of known good program code;

comparing state identifiers associated with normal program code operation relative to those of the first set of computer data;

identifying as a result of the comparison that the set of actions correspond to the known good actions of the known good program code; and allowing the first received set of computer data to be sent to the intended destination based on the identification that the set of actions correspond to the known good actions and based on identifying that the state identifiers correspond to the normal program code operation.

2. The method of claim 1, further comprising comparing data collected when the processor executes the instructions included in the first set of computer data when identifying that the collected data corresponds to the normal program code operation.

3. The method of claim 1, wherein the instructions included in the first set of computer data are executed by the processor for an amount of time that corresponds to a time threshold.

4. The method of claim 1, further comprising:
receiving a second set of computer data that includes instructions executable by the processor;
executing by the processor the instructions included in the second set of computer data, the execution of the instructions included in the second set of computer data resulting in a second set of actions being performed by the processor;
identifying that at least one action of the second set of actions do not correspond to the known good actions; and
preventing the second set of computer data from being sent to a recipient device based on the identification that the at least one action does not correspond to the known good actions.

5. The method of claim 1, further comprising:
receiving a second set of computer data that includes instructions executable by the processor;
executing by the processor the instructions included in the second set of computer data that results in a set of data being collected;
identifying that the set of collected data does not correspond to the normal program code operation; and
preventing the second set of computer data from being sent to a recipient device based on the identification that the set of collected data does not correspond to the normal program code operation.

6. The method of claim 1, further comprising:
collecting the set of actions performed by the known good program code when a central processing unit (CPU) executes instructions of the known good program code;
associating the collected set of actions with the known good actions;
collecting known good data associated with operation of the known good program code when the CPU executes the instructions of the known good program code; and
associating the known good collected data with the normal program code operation.

7. The method of claim 6, further comprising:
storing the collected set of actions in a database; and
storing the known good collected data in the database.

8. The method of claim 7, further comprising:
retrieving the known good actions inclusive of the collected set of actions from the database; and
retrieving the known good collected data from the database.

9. The method of claim 1, further comprising:
associating each action of the set of actions and accessed memory locations with a respective state, a respective known good action, and with a respective memory location based on execution of the parent process; and
identifying that data collected when the instructions included in the first set of computer data are executed correspond to normal program code operation based on each of the accessed memory locations corresponding to the respective state, the respective known good action, and the respective memory location.

10. A non-transitory computer-readable storage medium having embodied thereon a program executable by a processor for implementing a method for analyzing received computer data, the method comprising:
receiving a first set of computer data that includes instructions executable by the processor before the first set of computer data is received by an intended destination;
creating a child process by the processor based on execution of instructions of a parent process such that a set of actions performed by the execution of the child process are observed by the processor;
executing the instructions included in the first set of computer data based on the creation of the child process and the observations by the processor, wherein the execution of the instructions of the first set of computer data results in the set of actions being performed by the processor;
executing the instructions of the parent process to compare the set of actions of the first set of computer data with known good actions of known good program code;
comparing state identifiers associated with normal program code operation relative to those of the first set of computer data;
identifying as a result of the comparison correspond to the known good actions of the known good program code; and
allowing the first received set of computer data to be sent to the intended destination based on the identification that the set of actions correspond to the known good actions and based on identifying that the state identifiers correspond to the normal program code operation.

11. The non-transitory computer-readable storage medium of claim 10, the program further executable to compare data collected when the processor executes the instructions included in the first set of computer data when identifying that that the collected data corresponds to the normal program code operation.

12. The non-transitory computer-readable storage medium of claim 10, wherein the instructions included in the first set of computer data are executed for an amount of time that corresponds to a time threshold.

13. The non-transitory computer-readable storage medium of claim 10, the program further executable to:
receive a second set of computer data that includes instructions executable by the processor;
collect a second set of actions performed by the processor when the instructions included in the second set of computer data are executed;

identify that at least one action of the second set of actions do not correspond to the known good actions; and prevent the second set of computer data from being sent to a recipient device based on the identification that the at least one action does not correspond to the known good actions.

14. The non-transitory computer-readable storage medium of claim 10, the program further executable to:

receive a second set of computer data that includes instructions executable by the processor;

collect a set of data when the instructions included in the second set of computer data are executed;

identify that the set of collected data does not correspond to the normal program code operation; and prevent the set of computer data from being sent to a recipient device based on the identification that the second set of collected data does not correspond to the normal program code operation.

15. The non-transitory computer-readable storage medium of claim 10, the program further executable to:

collect the set of actions performed by the known good program code when instructions of the known good program code are executed;

associate the collected set of actions with the known good actions;

collect known good data associated with operation of the known good program code when the instructions of the known good program code are executed; and associate the known good collected data with the normal program code operation.

16. The non-transitory computer-readable storage medium of claim 15, the program further executable to:

store the collected set of actions in a database; and store the known good collected data in the database.

17. The non-transitory computer-readable storage medium of claim 16, the program further executable to:

retrieve the known good actions inclusive of the collected set of actions from the database; and retrieve the known good collected data from the database.

18. The non-transitory computer-readable storage medium of claim 10, the program further executable to:

associate each action of the set of actions and accessed memory locations with a respective state, a respective known good action, and with a respective memory location based on execution of the instructions of the parent process; and identify that data collected when the instructions included in the first set of computer data are executed correspond to normal program code operation based on each of the accessed memory locations corresponding to the respective state, the respective known good action, and the respective memory location.

19. An apparatus for analyzing received computer data, the apparatus comprising:

a memory; and a processor, wherein the processor executes instructions out of the memory to:

receive a first set of computer data that includes instructions executable by a processor before the first set of computer data is received by an intended destination, create a child process by the processor based on execution of instructions of a parent process such that a set of actions performed by the execution of the child process are observed by the processor, execute the instructions included in the first set of computer data based on the creation of the child process and the observations by the processor, wherein the execution of the instructions of the first set of computer data results in [[all the set of actions being performed by the processor, execute the instructions of the parent process to compare the set of actions of the first set of computer data with known good actions of known good program code, comparing state identifiers associated with normal program code operation relative to those of the first set of computer data, identify as a result of the comparison that the set of actions correspond to the known good actions of the known good program code, and allow the first received set of computer data to be sent to the intended destination based on the identification that the set of actions correspond to the known good actions and based on identifying that the state identifiers correspond to the normal program code operation.

20. The apparatus of claim 19, further comprising a database that stores information associating each action of the set of actions with a respective state, a respective known good action, and with a respective memory location.

* * * * *